United States Patent [19]
Fréchet et al.

[11] Patent Number: 5,679,748
[45] Date of Patent: Oct. 21, 1997

[54] PROCESS FOR OXIDATIVE FUNCTIONALIZATION OF POLYMERS CONTAINING ALKYLSTYRENE

[75] Inventors: Jean M. J. Fréchet, Ithica, N.Y.; Shah A. Haque, Houston; Hsien-Chang Wang, Bellaire, both of Tex.

[73] Assignee: Exxon Chemical Patents Inc., Houston, Tex.

[21] Appl. No.: 628,416

[22] Filed: Apr. 5, 1996

[51] Int. Cl.$^6$ ..................................................... C08F 8/06
[52] U.S. Cl. ........................ 525/360; 525/333.3; 525/387
[58] Field of Search ............................... 525/360, 387

[56] References Cited

U.S. PATENT DOCUMENTS

| | | | |
|---|---|---|---|
| 3,864,293 | 2/1975 | Miyoshi et al. | 260/23.7 |
| 4,517,318 | 5/1985 | Miyoshi et al. | 523/126 |
| 5,162,445 | 11/1992 | Powers et al. | 525/333.4 |
| 5,376,732 | 12/1994 | Stover et al. | 525/388 |

OTHER PUBLICATIONS

Bird, C.W. et al., "A Convenient Synthesis by p–Hydroxybenzaldehydes," *Org. Prep. and Procedures Int.* 12 201 (1980).

Lee, H. et al., "Benzylic Oxidation with 2,3–Dichloro–5, 6–Dicyanobenzoquinone in Aqueous Media. A Convenient Synthesis of Aryl Ketones and Aldehydes," *J. Org. Chem.* 48, 749 (1983).

Chidambaram, fN. et al., "tert–Butyl Hydroperoxide Pyridinium Dichromate: A Convenient Reagent System for Allylic and Benzylic Oxidation," *J. Org. Chem.* 52, 5048 (1978).

Capdeville, P. et al., "A New Oxidizing Copper Reagent: $CuO_2H$ Preparation and Preliminary Study of Reactivity," *Tetrahedron Lett.* 31, 3891 (1990).

Hay, A.S. et al., "Autoxidation Reactions Catalyzed by Cobalt Acetate Bromide," *Canadian J. Chem.* 43, 1306 (1965).

Muzart J. et al., "Practical Chromium VI Oxide–Catalyzed Benzylic Oxidations Using 70% tert–Butylhydroperoxide," *Tetradedron Letts.* 3(8), 595 (1992).

Zhang, S. et al., "Selective Indirect Electrooxidation of the Side Chain of Aromatic Compounds," *Chin. Chem. Lett.* 3 (8), 595 (1992).

Shul'pin, B.G. et al., "Photoinduced Reactions of Organic Compounds with Transition Metal Complexes. Oxidation of Alkanes and Alkylbenzenes with Oxo Compounds of Chromium (VI) Under Irradiation with Light," *Zh. Obscheh, Khim.* 59(11), 2604 (1989).

Hronec, M. et al., "Kenetics and Mechanism Of Cobalt–Catalyzed Oxidation of p–Xylene in the Presence of Water," *Ind. Eng. Chem. Process Des. Dev.* 23, 787–794 (1985).

Hendricks, C. et al., "The Oxidation of Substituted Toluences by Cobalt (III) Acetate in Acetic Acid Solution," *Ind. Eng. Chem. Prod. Res. Dev.* (17(3), 256–260 (1978).

Hanotier, J. et al., "Effect of Strong Acids on the Oxidation of Alkylarenes by Manganic and Cobaltic Acetanes in Acetic Acid," *J. Chem. Soc. Perkins Trans.* 2, 381–383 (1973).

Okada, T. et al., "The Liquid–Phase Oxidation of Methylbenzenes by the Cobalt–Copper–Bromide System," *Bull. Chem. Soc. Jpn.* 54, 2724–2727.

Harustiak, M. et al, "Kinetics and Mechanism of Colbalt Bromide Catalyzed Oxidation of p–Xylene in the Presence of Phase Transfer Catalysts," *J. Mol. Catal.* 53(1), 209–217.

Ferrari, L. et al., "Cobalt–Catalyzed Oxidation of Poly(4–Methylstyrene)," *Macromolecules*, 24, 6340–6342 (1991).

Glagoleva, Yu. A et al., "Investigation of the Thermal–Oxidation Degradation of Certain Methyl–Substituted Polymers," *Vysokomol. Soyed.* A12: No. 9, 1994–2000, 1970., 2263–2270.

Ferrari, Lorenzo P. et al., "Cobalt–Catalyst Oxidation of Poly(4–methylstyrene)", *Macromolecular* 1991, 24, 6340–6342.

Weissermel, K. et al., "Industrial Organic Chemistry", Verlag Chemie, 1978, pp. 341 to 6. (Abstract Only).

J. K. Kochi, "Free Radicals", vol. 1, ed. J. K. Kochi, Wiley & Sons, 1973, pp. 643 to 50.

Rabek, J. F., et al., Macromolecules, 19, 1674 to 9 (1986). "Charge–Transfer Complexes Between Molecular Oxygen and Polystyrenes."

Weir, N.A. et al., "The Kinetics of Photo–Initiated Oxidation of Poly(p–Methylstyrene) in Solution," *Polymer Degradation and Stability* 2 (1980) 225–238.

Boerio, F. J., et al., "Selective Oxidation of Para–Substituted Polystyrenes During Surface–Enhanced Raman Scattering," *Macromolecules* 1989, 22, 3955–3960.

Berko, Henry et al., "Photo–Oxidative Degradation of Copolymers of Acrylonitrile with Styrene, a–methylstyrene and p–methylstyrene," *Polymer Degradation and Stability* 37 (1992) 85–90.

*Primary Examiner*—Bernard Lipman
*Attorney, Agent, or Firm*—Myron B. Kurtzman; Frank E. Reid

[57] ABSTRACT

This invention provides a method by which an alkylstyrene containing polymer may be exclusively functionalized at the primary benzylic carbon site of the styrenic monomer. The process of this invention comprises the treatment of an alkylstyrene containing polymer dissolved in a non-polar liquid medium with an organic hydroperoxide oxidizing reagent in the presence of a catalytically sufficient amount of a chromium compound, to oxidize a portion of the aromatic alkyl groups of the polymer to an oxygen containing functional group.

15 Claims, No Drawings

PROCESS FOR OXIDATIVE FUNCTIONALIZATION OF POLYMERS CONTAINING ALKYLSTYRENE

FIELD OF THE INVENTION

This invention relates to polymers containing alkyl styrene monomer units, the alkyl substituent group(s) of which are functionalized by a catalytic oxidative procedure.

BACKGROUND OF THE INVENTION

Heretofore, butyl rubbers, i.e., polymers of isobutylene and small amounts of isoprene as a comonomer, and/or halobutyl rubbers, i.e., a halogenated derivative of a butyl rubber, have been used for forming blend compositions with thermoplastic compounds and other elastomer compounds for use in tire production and the like. The butyl and/or halobutyl rubbers impart a number of desirable physical properties to such blends, such as low air permeability, relatively low glass transition temperature ($T_g$), broad damping peaks, environmental aging resistance including a resistance to oxidation, etc., that are significant in the production of tires of superior performance properties. However, various difficulties are encountered with the use of the butyl and/or halobutyl rubbers for this purpose, chief among which is their compatibility with most other polymers, including unsaturated elastomeric compounds. Hence, that aspect of a butyl rubber that provides properties which make it desirable as a component in blends for tire production, namely the chemical "inertness" that results from the unreactiveness of the hydrocarbon backbone of the butyl rubber polymer, also results in its low reactivity and compatibility with most other materials and this has limited its use in many areas.

Recently, in U.S. Pat. No. 5,162,445 a unique copolymer of isobutylene has been disclosed, together with a procedure for introducing non-backbone functionalities into this copolymer, which well suits it to use as a blend component having all the property advantages of a butyl and/or halobutyl rubber, but which improves the compatibility compared to butyl and/or halobutyl rubber. In its broadest description, the new copolymer is a direct reaction product of an isoolefin having from 4 to 7 carbon atoms with a para-alkylstyrene; isobutylene and paramethylstyrene being the preferred monomers; wherein the copolymer has a substantially homogeneous compositional distribution, meaning all weight fractions of the copolymer have essentially the same ratio of isoolefin to para-alkylstyrene. The homogeneity of the comonomer distribution and molecular weight distribution of this new isobutylene-paraalkylstyrene (IB-AS) copolymer impart to it superior properties. One of the aspects in which this new IB-AS copolymer is superior to butyl rubbers is its resistance to oxidation by atmospheric oxygen and ozone. The new isobutylene-paraalkylstyrene (IB-AS) copolymer can be produced over a broad range of number average molecular weight ($M_n$) greater than 25,000 and a narrow molecular weight distribution ($M_w/M_n$) of less than 6.0, even of less than 2.0. Derivatives of this new isobutylene-paraalkylstyrene copolymer (IB-AS copolymer) having functionalities that render it compatible and/or crosslinkable with other polymer materials, both thermoplastic and elastomeric polymers, are produced in two step process, by nucleophilic substitution of a halogenated intermediate that is first produced by a free radical initiated halogenation of the IB-AS copolymer.

As related by U.S. Pat. No. 5,162,445, it was found that free radical bromination of the new IB-AS copolymer proceeded at the alkyl group (the alkyl primary benzylic carbon atom) of the styrenic comonomer and to the substantial exclusion of bromination at the tertiary primary benzylic carbon atom (in the backbone chain of the copolymer). This then preserves the initial microstructure of the IB-AS copolymer backbone chain, thus preserving the hydrocarbon nature with its "inertness" of the backbone and the beneficial physical properties.

In U.S. Pat. No. 5,162,445 a preferred copolymer is that of isobutylene (IB) and paramethylstyrene (PMS) and this copolymer (IB-PMS) is brominated to provide a copolymer having a portion of its paramethylstyrene brominated at the paramethyl group. The brominated copolymer is essentially a high molecular weight, narrow molecular weight distribution polymer of a homogeneous distribution of isobutylene-paramethylstyrene-parabromomethylstyrene. The benzylic bromine atoms are reactive under mild conditions in the presence of a nucleophilic reagent. It was found that a variety of functional groups could be introduced at the site of the brominated paramethyl carbon atoms of the pendant phenyl groups without disruption of the backbone structure or altering the molecular weight and/or molecular weight distribution characteristics of this copolymer. This is then particularly well suited for use as a blending component with other thermoplastics and/or elastomeric polymers for use in the fabrication of desirable products, especially for tire production.

Though the functionalized derivatives that are realized through the brominated-copolymer intermediate in two step process, it would be desirable to provide additional methods for functionalization in a single step. To convert the new isobutylene-paraalkylstyrene copolymer materials into functionalized derivatives without the need to employ a halogen in the process, a metalation procedure was developed as described in commonly owned U.S. patent application Ser. No. 08/446,753. In this procedure the paramethyl group of a paramethylstyrene unit of the IB-PMS copolymer is first metallated by a super base reagent and quenched reacted with a suitable electrophile. An advantage of this procedure is that it is free from use of any halogen, essentially a single step process, albeit that it requires the employment of more expensive reagents.

Neither the free radical halogenation and then nucleophilic displacement procedure as described in U.S. Pat. No. 5,162,445 nor the single step super base metalation-electrophilic displacement procedure as disclosed in commonly owned U.S. Ser. No. 08/446,753 provides for the direct introduction of carbonyl functionalities into IB-AS copolymer. To directly introduce a carbonyl functionality into an IB-AS copolymer would require an oxidative procedure.

The oxidation of simple molecules of mono alkyl or multi alkyl substituted benzene have been reported in a variety of references, such as Bird, C. W. et al., "A convenient synthesis by p-hydroxybenzaldehydes," *Org. Prep. and Procedures Int.* 12, 201 (1980); Lee, H. et al., "Benzylic oxidation with 2,3-dichloro-5,6-dicyanobenzoquinone in aqueous media. A convenient synthesis of aryl ketones and aldehydes," *J. Org. Chem.* 48, 749 (1983); Chidambaram, N. et al., "tert-Butyl hydroperoxide pyridinium dichromate: A convenient reagent system for allylic and benzylic oxidation," *J. Org. Chem.*, 52. 5048 (1978); Capdeville, P. et al., "A new oxidizing copper reagent: $CuO_2H$ preparation and preliminary study of reactivity," *Tetrahedron Lett.* 31, 3891 (1990); Hay, A. S. et al. "Autoxidation reactions catalyzed by cobalt acetate bromide," *Canandian J. Chem.* 43, 1306 (1965); Sala, T. et al. "Tetrabutylammonium permanganet: an efficient oxidant for organic substrates," *J. Chem. Soc. Chem. Commun.* 253 (1978); Muzart, J. et al. "Practical chromium VI oxide-catalyzed benzylic oxidations using 70% tert-butylhydroperoxide," *Tetradedron Letts.* 23, 2132 (1987); Zhang, S. et al., "Selective indirect electrooxidation of the side chain of aromatic compounds," *Chin. Chem. Lett.* 3(8), 595 (1992); Shul'pin, B. G. et al., "Photoinduced reactions of organic compounds with transition metal complexes. Oxidation of alkanes and alkylbenzenes with oxo compounds of chromium (VI) under irradiation with light," *Zh. Obscheh. Khim.* 59(11), 2604 (1989). Hronec, M. et al, "Kinetics and mechanism of cobalt-catalyzed oxidation of p-xylene in the presence of water," *Ind. Eng. Chem. Process Des. Dev.* 23, 787–794 (1985); Hendricks, C. et al, "The oxidation of substituted toluenes by cobalt (III) acetate in acetic acid solution," *Ind. Eng. Chem. Prod. Res. Dev.* 17(3), 256–260 (1978); Hanotier, J. et al., "Effect of strong acids on the oxidation of alkylarenes by manganic and cobaltic acetates in acetic Acid," *J. Chem, Soc. Perkins Trans.* 2, 381–383 (1973); Okada, T. et al., "The liquid-phase oxidation of methylbenzenes by the cobalt-copper-bromide system," *Bull. Chem. Sos. Jpn.* 54, 2724–2727; Harustiak, M. et al., "Kinetics and mechanism of cobalt bromide catalyzed oxidation of p-xylene in the presence of phase transfer catalysts," *J. Mol. Catal.* 53(1), 209–217. Alkyl substituted benzenes in the presence of a polar medium, such as acetic acid, reported to be oxidized by chromic oxide, cobalt salts, manganic and cobaltic acetates, and cobalt-copper-bromide systems. Although such systems are applicable to molecular materials, such as toluene, xylene, etc., they are not applicable to polymeric materials, such as alkyl styrene containing polyolefin, which is highly non-polar and therefore essentially insoluble in the polar reaction medium.

The liquid phase oxidation of homopolymer of paramethylstyrene (PMS) using air as an oxidizing agent in the presence of a bromine promoted catalyst has been reported by Stover et al. U.S. Pat. No. 5,376,732 (1994) and WO 94/10215 publication. This procedure as described by the Stover patent and/or the related paper of Ferrari, L. et al., "Cobalt-catalyzed oxidation of poly(4-methylstyrene)," *Macromolecules,* 24, 6340–6342 (1991), requires use of a cosolvent medium containing acetic acid. The presence of acetic acid as a required component in the cosolvent medium severely limits the quantity of precursor polymer that may be treated, generally to concentrations significantly less than 5 gm per 100 ml. The maximum molecular weight of a precursor polymer reported to be treated by this method, as described in U.S. Pat. No. 5,376,732, is a weight average molecular weight (Mw) of 14,600 and Mw/Mn=1.71. This limitation is readily attributable to the poor solubility of the precursor polymer in a medium in which acetic acid is a cosolvent.

It is still desirable to devise a simple, direct and inexpensive way by which to convert the new IB-AS copolymer materials into functionalized derivatives without the need to employ a halogen or halogenated compounds, acetic acid or other polar cosolvents in the process.

A method of functionalization is necessary for IB-alkylstyrene (AS) copolymer in which alkyl group may be in ortho, meta, or para position, including multi alkyl groups at random in any position of the aromatic ring.

SUMMARY OF THE INVENTION

This invention provides a method by which an alkylstyrene containing polymer, for example, an isobutylene-alkylstyrene (IB-AS) copolymer, may be functionalized at the primary benzylic carbon site of the styrenic monomer without the need to employ a halogen or halogenated compound, acetic acid or other polar compounds as a cosolvent. As described with respect to an IB-AS copolymer, the method comprises treating the copolymer while in solution in a non-polar medium, such as a hydrocarbon solvent, to the action of an effective catalytic amount of a chromium compound capable of performing as an oxidation catalyst, preferably a Cr (VI) compound such as chromium oxide ($CrO_3$) or a Cr compound that oxidizes to Cr (VI) during the catalytic action, and an effective amount of an organic hydroperoxide, preferably an alkyl hydroperoxide, to oxidize alkyl group at the primary benzylic carbon atom of the styrene units of the copolymer to a carbonyl functional group.

With the method of this invention it is now possible to introduce certain types of carbonyl atom functional groups into the isobutylene-alkylstyrene copolymer which cannot be introduced through the bromination and then nucleophilic displacement procedure as described in U.S. Pat. No. 5,162, 445 or the metalation-electrophilic reagent procedure described in U.S. Ser. No. 446,753. Further, the oxidative procedure of this invention is not subject to the deficiencies of previously described oxidative procedures which preclude their effective application to high molecular weight polymeric materials containing alkylsytrenes, namely the requirement of a polar cosolvent component that severely reduces the solubility of such polymeric materials. In the oxidative procedure of this invention a polar cosolvent is not used and the precursor polymer may be treated as a high concentration solution, making the oxidative procedure of this invention applicable to treatment of all compositions of isoolefin-alkylstyrene (ISO-AS). The oxidative procedure of this invention is particularly effective for oxidizing an isobutylene-alkylstyrene copolymer (IB-AS) which is otherwise resistant to oxidation by techniques employed on simple alkylstyrene molecules of homopolymers. The process is versatile in the sense that more than one alkyl substituted styrene containing copolymer may be oxidized to carbonyl functionality at one or more alkyl site of the aromatic ring. As a matter of fact, homopolymers of mono or multi alkyl substituted styrene may be effectively oxidized also.

DESCRIPTION OF THE PREFERRED EMBODIMENTS

This invention comprises a method for converting amono or multi alkyl substituted styrene containing precursor polymer to a product polymer in which a fraction of the alkyl groups of the styrene unit in homo- or co- polymer are converted into a carbonyl atom functional group. The conversion of an alkylsytrene monomer contained by a precursor polymer which is accomplished by practice of this invention may be illustrated as follows:

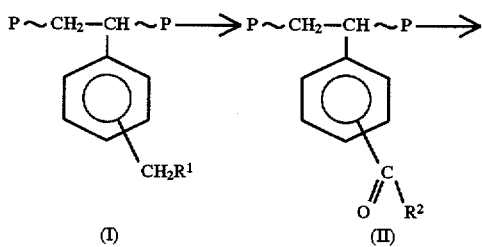

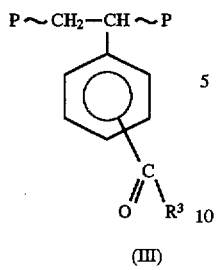

(III)

wherein:

P represents the remainder of the polymer chain of the precursor polymer.

$R^1$ is hydrogen or an alkyl group preferably having 1 to 8 carbon atoms, $R^2$ is hydrogen, alkyl (preferably having from 1 to 8 carbon atoms) or a hydroxyl group, and $R^3$ is an alkoxy, amino, halogen or metal group.

The precursor polymer, formula I, is first oxidized to a product polymer in which the primary benzylic carbon atom of the alkyl group of the styrene monomer is oxidized to a carboxylic acid and an aldehyde group, represented by formula II. The conditions of the oxidation reaction determine which derivative, the aldehyde or the carboxylic acid, predominate. This product polymer (II) may be recovered and used as such or it may be further reacted with an alcohol, amine, acid halide or a base to convert the carbonyl functional group thereof to an ester, amide, acid halide or carboxylic salt functional group as represented by formula (III).

The precursor polymer may be a homo or copolymer of an alkylstyrene in which the alkyl group is located at any position, ortho, meta or para, on the phenyl ring. The alkyl group may be one or more in the ortho, meta, and/or para position of the phenyl ring. Typically, the precursor polymers are polyalkylstyrenes, such as poly-p-alkylstyrene, poly-o-alkylstyrene poly-m-alkylstyrene, poly-2,4-alkylstyrene, poly-2,5-alkylstyrene, wherein the alkyl groups can have from 1 to 8 carbons, preferably 1 to 4 carbon atoms, and most preferably 1 or 2 carbon atoms; isoolefin-alkylstyrenes copolymers wherein the isoolefin can have from 1 to 7 carbon atoms and the alkyl group can have from 1 to 8 carbon atoms such as isobutylene-p-methylstyrene copolymers, isobutylene-m-styrene copolymers, isobutylene-o-methylstyrene copolymers, isobutylene-p-ethylstyrene copolymers, isobutylene-o-ethylstyrene, isobutylene-m-ethylstyrene copolymers, isobutylene-2,5-methylstyrene copolymers, isobutylene-2, 4-methylstyrene copolymers and mixtures thereof such as a mixture of isobutylene-p-methylstyrene copolymers and isobutylene-o-methylstyrene copolymers. The precursor polymer may be of any molecular weight, as high as 1,000,000 or even greater, limited only by a necessity that the precursor polymer must be soluble to some degree in a non-polar medium, such as a hydrocarbon solvent. The process of this invention is particularly useful with respect to copolymers of an isoolefin and an alkylstyrene wherein the isoolefin content of the copolymer is about 50 mole % or greater of the copolymer and preferably 50–90 mole % of the copolymer. Such copolymers of an alkylstyrene are generally resistant to oxidation, which is one of their properties that makes them desirable for use in various applications, and heretofore it has not been possible to produce functionalized derivatives of such copolymers by an oxidation procedure.

Precursor polymers of particular interest are those wherein the alkyl substituent of the styrene monomer are located in the para position, such as poly(4-alkylstyrenes) and isoolefin-para-alkylstyrene copolymers. Of these the isoolefin-para-alkylstyrene copolymers are of particular interest and the process of this invention will hereafter be described with reference to these copolymers, although it should be understood that the process is applicable to the other classes of homo and copolymer precursors as described.

In an embodiment of this invention there is provided a process comprising the treatment of an isoolefin-alkylstyrene (ISO-AS) copolymer dissolved in a non-polar liquid medium with an organic hydroperoxide oxidizing reagent in the presence of a catalytically sufficient amount of a chromium compound, such as $CrO_3$, in order to oxidize a fraction of the alkyl groups of the alkylstyrene to an oxygen containing functional group. In one embodiment, this invention provides for the oxidation of the primary benzylic carbon of the alkyl group of the styrenic comonomer unit. The degree to which the alkylstyrene content of the precursor copolymer is converted to an oxygen containing functionalized derivative may be conveniently controlled through appropriate selection of the conditions of reaction such as the organic hydroperoxide concentration, catalyst amount and/or the time and temperature of the reaction.

The isoolefin-alkylstyrene (ISO-AS) particularly preferred for application of the oxidative-functionalization process of this invention are those as described in U.S. Pat. No. 5,162,445, the disclosure of which is hereby incorporated by reference as if fully set forth and described herein for purposes of U.S. patent practice. Those copolymers of particular interest, and hence the preferred copolymers, are those of isobutylene (IB) and alkylstyrene (AS) and particularly those of isobutylene and paramethylstyrene (PMS), which may hereafter be referred to as an IB-PMS copolymer. Of these IB-PMS copolymers, the most preferred are the IB-PMS copolymers that exhibit elastomeric properties. The more preferred elastomeric IB-PMS copolymers have an isobutylene content of from about 80 to 96 weight percent (about 89 to 98 mole %) and a paramethystyrene content of about 20 to 4 weight percent (about 11-2 mole %). Generally, the elastomeric IB-PMS copolymers have a number average molecular weight ($M_n$) of 500 or greater, preferably of 25,000 or greater, ranging up to about 2,000,000 and their molecular weight distribution is less than 6.0, preferably less than 4.0, and most preferably less than 2.5. Preferably the $M_n$ is between 80,000 and 1,000,000.

The high molecular weight IB-PMS elastomeric copolymers, when functionalized in accordance with this invention, retain their superior rubber properties and are especially useful and desired as compounded rubber compositions and as blending components for the formulation of blend compositions with other thermoplastic and/or elastomeric polymers used in the production of carcass, side wall, tread and other components of pneumatic tires having superior performance properties. The lower molecular weight IB-PMS elastomeric copolymers when functionalized by the process of this invention are particularly useful as lube oil additives and adhesives.

Solvents which may be employed as the neutral non-polar liquid medium for reaction are one or more hydrocarbon solvents that have boiling points from about 0° C. to about 200° C. The hydrocarbon solvent can be benzene or an aliphatic or cycloaliphatic hydrocarbon and preferably is a hydrocarbon in which the IB-AS copolymer is soluble to at least the extent of about 5 gm per 100 ml. Among the suitable solvents, preferred solvents include pentane, n-hexane, heptane, octane, nonane, decane, cyclohexane, methylcyclohexane, and the like.

The oxidizing agent for this procedure may be any organic hydroperoxide which is sufficiently soluble in the selected non-polar medium to provide for a soluble concentration of the organic hydroperoxide that, with reference to the alkyl styrene content of the IB-AS copolymer dissolved in the medium, provides for a molar ratio of hydroperoxide to alkyl styrene of from about 8 to about 25.

Illustrative of the preferred organic hydroperoxides for use are 1,1-dimethylethyl hydroperoxide [t-butyl hydroperoxide]; 1,1-dimethylpropyl hydroperoxide [t-amyl hydroperoxide]; 1,1,3,3-tetromethylbutyl hydroperoxide; and (1,1,4,4-tetramethyl-1,4-butadienyl)bis hydroperoxide. Of these t-butyl hydroperoxide is the most preferred for use as the oxidizing agent.

The organic hydroperoxide selected for use may be directly used in its commercially available form—generally as a 5.0 to 6.0M solution of the hydroperoxide in decane or nonane.

The catalyst for the oxidation reactions may suitably be any chromium moiety, oxidizable to Chromium VI under the conditions for oxidizing the alkyl group, and which is soluble in the non-polar reaction medium when mixed with an organic hydroperoxide. Suitable chromium compounds which may serve as a catalyst include chromium trioxide (CrO$_3$); various co-ordinate ligand derivatives of chromium tetra carbonyl, such as Cr(CO)$_4$X wherein coordinate ligand X is 1,10 phenanthroline, 2,2'-dipyridyl, ethylenediamine, cyclohexane-1,2-diamine or 2,5-dithiahexane; coordinate ligand derivatives of chromium tricarbonyl, such as Cr(CO)$_3$Y wherein coordinate ligand Y is diethylenetriamine or 3,6,9-trithiaundecane; chromyl oxides like CrO$_2$Z$_2$ where Z is acetate, benzoate or the like; chromium anhydride compounds of the formula:

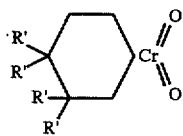

where R' is an alkyl group and each R' is preferably a methyl. Of these the most preferred as the catalyst for reaction is CrO$_3$.

In its most general application the process of this invention is practiced by bringing the IB-AS copolymer, oxidizing reagent and catalyst together in solution in a non-polar liquid medium under a condition of temperature and for a time sufficient to affect oxidation of at least about 5 mole % of the AS content available in the non-polar liquid medium solution. The oxidization reaction will proceed at temperatures as low as 0° C., albeit at a slow rate. Hence, it is preferred to conduct the reaction at a temperature of at least 10° C., and more preferably at least 20° C. Generally it is not beneficial or desirable to exceed a temperature of about 60° C. for the reaction. The reactants may be maintained in contact for any length of time desired. Generally, in the temperature range of 20° C. to 60° C. for the reaction, the degree of reaction desired may be achieved within a contact period of about 8 to about 20 hours.

The order in which any of the respective components—precursor polymer, oxidizing agent, catalyst—are first brought into solution in the non-polar medium can be any. For convenience, the IB-AS copolymer may be, and preferably is, first dissolved in the non-polar medium in an amount to provide for the concentration of copolymer desired, up to and including that amount corresponding to its solubility limited concentration in the medium selected.

Hence, it is preferred to utilize the IB-AS copolymer in solution concentrations of at least about 5 gm per 100 ml., and more preferably in concentrations of 10 to 20 gm per 100 ml. Once the polymer solution is prepared, either or both of the catalyst and oxidizing agent may be added to the solution, together or separately, preferably with stirring or mixing of the solution during and following their addition. In another embodiment, the catalyst composition may be added to the concentration in which the catalyst is desired to be present and thereafter the organic hydroperoxide may be added. In another embodiment, the catalyst and oxidizing agent may be added to the polymer solution while maintaining the solution at the temperature at which it is desired to conduct the oxidation reaction or, if the medium temperature is lower during the course of these additions it may be elevated to the temperature desired for the reaction following their addition.

The quantity of catalyst and organic hydroperoxide to be used is most conveniently expressed as a mole % or molar ratio relative to the alkylstyrene content of the IB-AS copolymer being treated. Hence, for the desired degree of conversion of AS groups to be achieved within a reasonable frame of time (24 hours or less) the catalyst composition should be used in a quantity which provides for at least about 1 mole % of catalyst relative to the AS content. The catalyst quantity may, but preferably does not exceed about 15 mole % of the AS content. Wherein the catalyst is CrO$_3$ it is preferably employed in an amount that provides for from about 5 to about 10 mole % of PMS content of IB-PMS copolymer.

Generally, the organic hydroperoxide oxidizing agent may be used in an amount which provides a mole ratio of hydroperoxide to the AS content of the copolymer undergoing treatment of at least about 8:1. For a given time and temperature of the reaction the quantity of AS converted by oxidation to a functionalized group will increase as the quantity of organic hydroperoxide utilized increases, up to a mole ratio of hydroperoxide to the AS content of the copolymer undergoing treatment of about 25:1. Utilization of quantities of organic hydroperoxide beyond this amount does not significantly increase the degree of conversion.

Within the above described concentration ranges for the IB-AS copolymer, catalyst and organic hydroperoxide components the oxidation reaction will occur within a range of temperature of from about 20° C. to about 50° C. to affect a conversion of from about 5 to about 50 mole % of the AS content available for reaction within a period of time ranging from about 8 to about 24 hours. The resulting oxidation product is an isobutylene-methylstyrene-vinylbenzoic acid terpolymer, with trace amounts of vinylbenzaldehyde which possesses a $M_w/M_n$ and a number average molecular weight which substantially corresponds to that of the precursor IB-methylstyrene (MS) copolymer.

The product polymer resulting from the oxidation of the IB-AS copolymer is a IB-AS-vinylbenzoic acid terpolymer. The terpolymer product which may be recovered as such or it may be further reacted with another reagent to convert all or part of its carboxylic functional group to an acid halide, amide, ester, or carboxylic salt functional group.

EXAMPLES

The following examples illustrate practices in accordance with the process of this invention. Unless otherwise stated, molecular weights reported as Mn and Mw were determined by Gel Permeation Chromatography (GPC), respectively.

The percentage of PMS content of a IB-PMS copolymer was determined by $^1$H NMR. The acid content of a product polymer was determined by $^1$H NMR and FTIR.

In each of Example 1–7 which follow the precursor polymer used was an isobutylene-paramethylstyrene copolymer (IB-PMS), which had a content of isobutylene of 97.5 mole % and a content of paramethylstyrene of 2.5 mole %. The precursor polymer had a weight average molecular weight ($M_w$) of 35,000 and a molecular weight distribution ($M_w/M_n$) of 3.5.

Example 1

To a 20 gm per 100 ml solution in dry n-hexane of an IB-PMS copolymer, having an IB content=97.5 mole %, a PMS content=2.5 mole %, $M_w$=35,000, and a molecular weight distribution ($M_w/M_N$)=3.5, a catalytic amount of $CrO_3$ (0.004 g/gm of polymer i.e., about 10 mole % of PMS unit) was added and stirred under an argon atmosphere. To this solution t-butyl hydrohydroperoxide (5M solution in decane) was then added in an excess of 15 times the molar amount of PMS unit. The reaction was conducted at 45°–50° C. for 20 hours.

The product was washed with 50% HCl saturated NaCl solution, and 5 times with acetone water (20/80 v/v) to near neutral. Finally, the product polymer was precipitated in acetone, washed with acetone and dried at 60°–65° C. for 2 days. $^1$H NMR and FTIR indicated —COOH functionality, and conversion was about 40% of total PMS content of the starting copolymer. GPC results indicated that the product polymer had $M_w$=28,000 and a $M_w/M_n$=4.7.

Example 2

The same IB-PMS copolymer as in Example 1 was prepared as a 5 gm per 100 ml solution in dry n-hexane (3.47 g polymer in 70 ml n-hexane). To this solution 14 mg of $CrO_3$ (about 10 mole % of PMS) was added with stirring under an argon atmosphere while the solution was maintained at 40°–45° C. Thereafter 5.5 ml of 5M t-butyl hydroperoxide in decane was added to the solution and the reaction was conducted at 45°–50° C. for 25 hours. Recovery of the product and drying were carried out under identical condition as Example 1. $^1$H NMR and FTIR indicated —COOH functionality and a conversion of about 20.5% of the total PMS content of the starting copolymer.

Example 3

Effect of Reaction Temperature

The same reaction conditions of Example 2 were followed with the exception that the reaction was conducted at 60° C. As t-butyl hydroperoxide was added to the solution of IB-PMS copolymer at 60° C., it started to decompose (visible vigorous bubbling observed). No reaction of the IB-PMS copolymer to a —COOH functional derivative was found to have occurred after 4 hours. This example demonstrates that high temperature is undesirable.

Example 4

A 5 gm per 100 ml solution of the IB-PMS copolymer of Example 1 in dry n-hexane (3 g IB-PMS copolymer in 60 ml hexane) was prepared and 12 mg of $CrO_3$ was added to this solution with stirring under an argon atmosphere. Thereafter 2 ml of 5M t-butyl hydroperoxide in decane was added to the solution and the reaction was conducted at 45°–50° C. for 12 hours after which a first aliquot of the reaction solution was drawn off and thereafter an additional 2 ml of the 5M tertbutyl hydroperoxide solution was added and the course of reaction was continued at 45°–50° C. for further 15 hours, after which the reaction was ended and the product polymer was recovered under the same conditions as described in Example 1.

$^1$H NMR and FTIR analysis of the product polymer sampled after the end of 12 hours revealed that about 15% of PMS content of the starting copolymer has undergone conversion to a —COOH functionality. The final product polymer analyzed to have about 20% of the starting copolymer PMS content converted to —COOH functionality.

Example 5

Comparative

The same IB-PMS copolymer as in Example 1 was added to a cosolvent system of 15 ml dry n-hexane containing 1 ml acetic acid. The maximum concentration of dissolved IB-PMS copolymer that could be achieved was 0.56 g in 16 ml cosolvent or about 3.5 gm per 100 ml To this 3.5 gm per 100 ml IB-PMS copolymer solution cobalt acetate tetrahydrate was added in an amount to provide a molar ratio to the PMS content of the dissolved copolymer of 1:1. The solution was heated to 60° C. and thereafter $O_2$ was bubbled through the solution under stirring for 15 hours. At the conclusion of this time, the solution was treated as described in Example 1 to recover polymer. $^1$H NMR and FTIR analysis were performed on the recovered polymer and revealed that no detectable portion of the PMS content of the starting copolymer had been converted to —COOH functionality.

The procedure was repeated, except that NaBr was added in an amount equal to one equivalent of cobalt acetate tetrahydrate. Again $^1$H NMR and FTIR revealed no detectable portion of the PMS content had been converted to —COOH functionality.

Example 6

The same reaction of Example 5 was repeated except that 7 mg of $CrO_3$ was added instead of cobalt acetate tetrahydrate. All other conditions were the same as for Example 5 and the same results were observed, namely no detectable portion of the PMS content of the starting IB-PMS copolymer was converted to —COOH functionality.

Example 7

IB-PMS copolymer as in Example 1 was dissolved in dry n-hexane and then $CrO_3$ was added. Then 4 ml t-BuOOH (5M solution in decane) containing a trace of water added. It did not dissolve $CrO_3$ completely. A further 1.5 ml of the t-BuOOH solution was added, and the reaction was conducted at 40°–45° C. for 25 hours, and then at 60° C. for 2 hours. The product was washed with 50% HCl, isopropyl alcohol/$H_2O$ and precipitated in isopropyl alcohol. It was then dried at 80°–85° C. for 3 days. $^1$H NMR analysis established that a conversion of 25.4 mole % of the PMS content to a —COOH functionality had occurred.

Example 8

Oxidation of Homopolymer

Poly(para-methylstyrene) of molecular weight, $M_w$=517,800 and molecular weight distribution ($M_w/M_n$) of 1.98 was dissolved in cyclohexane to obtain a 5 gm per 100 ml solution under argon atmosphere. To this solution a catalytic amount of $CrO_3$ (1 mole % of PMS unit) was added, and then t-butyl hydroperoxide (5M solution in decane) was added in excess of 10 times the molar amount of PMS unit. The reaction was conducted at room temperature (20°–25° C.) for 25 hours. The product was washed with dilute HCl. The organic layer was evaporated and the solid polymer thus obtained was dissolved in tetrahydrofuran. The pure polymer was recovered by precipitation in water. It was reprecipitated from tetrahydrofuran to water, dried under vacuum at 50° C. for 2 days. FTIR and $^1$H NMR indicated oxidation to —COOH functionality and a small amount of —CHO. The conversion was about 30 mole % of PMS unit. The molecular weight of the product, as obtained by GPC, indicated to be $M_w=225{,}500$, and $M_w/M_n=3.3$.

Example 9

Effect of Molecular Weight

To find the effect of oxidation on the molecular weight, a very high molecular weight IB-PMS copolymer was oxidized following the procedure as set forth in the previous examples. The high molecular weight IB-PMS copolymer having an IB content=96.3 mole % and para-methylstyrene content=3.7 mole %, $M_w=517{,}300$ and a molecular weight distribution, $M_w/M_n=2.4$, was dissolved in cyclohexane to obtain a 5 gm per 100 ml solution under an argon atmosphere. To this stirring solution a catalytic amount of $CrO_3$ (10 mole % of PMS) was added and followed by addition of t-butyl hydroperoxide (5M solution in decane) in an excess of 10 times of the molar amount of PMS. The reaction was conducted at room temperature for 22 hours. The product was recovered by the usual procedure as mentioned in Example 1. FTIR and $^1$H NMR indicated —COOH functionality with conversion of about 10% of total PMS unit. The molecular weight of the material was measured to have $M_w=417{,}600$ and $M_w/M_n=2.20$.

Example 10

The same high molecular weight IB-PMS copolymer as in Example 9, was prepared as a 5 gm per 100 ml solution in cyclohexane under a nitrogen atmosphere. The solution was heated in an oil bath to 45° C. while stirring by magnetic stirrer. Then a catalytic amount of $CrO_3$ (10 mole % of PMS), and 15 times excess (of PMS unit) of t-butyl hydroperoxide (5M solution in decane) was added while stirring continued moderately. The reaction was conducted for 24 hours, and the oxidized product was recovered following the procedure as in Example 1. The FTIR and $^1$H NMR showed substantial oxidation of PMS unit to about 30 mole %. The GPC result indicated $M_w=362{,}300$ and molecular weight distribution, $M_w/M_n=2.35$.

Although the invention has been described by reference to its preferred embodiments, from this description those having ordinary skill in the art may appreciate changes and modifications that may be made to the subject matter described which does not depart from the scope and spirit of the invention as described above or claimed below.

We claim:

1. A method of introducing functionality into a precursor polymer containing an alkyl substituted styrene monomer comprising the steps of:

forming a solution of said precursor polymer in a hydrocarbon solvent;

adding to said polymer solution a catalytically effective amount of a hydrocarbon soluble chromium compound and an amount of an organic hydroperoxide effective to oxidize at least a portion of the alkyl substituents of the alkyl substituted styrene content of the said precursor polymer to form a product polymer containing a carbonyl atom containing functional groups.

2. The method of claim 1, wherein said precursor polymer is a copolymer of a $C_1$ to $C_7$ isoolefin and a $C_1$ to $C_8$ alkylstyrene containing one or more alkyl groups in the aromatic ring.

3. The method of claim 2, wherein said precursor polymer is a copolymer of the isoolefin and one or more of ortho, meta, and para alkylstyrenes.

4. The method of claim 1, wherein the precursor polymer is isobutylene-co-p-methylstyrene.

5. The method of claim 1, wherein said organic hydroperoxide is of the formula:

R—OOH and

HOO—R*—OOH, wherein R is an alkyl group of from 4 to 12 carbon atoms and R* is an alkylene group of from 3 to 12 carbon atoms.

6. The method of claim 5, wherein said organic hydroperoxide is 1,1-dimethylethyl hydroperoxide; 1,1-dimethylpropyl hydroperoxide; 1,1,3,3-tetramethylbutyl hydroperoxide; and (1,1,4,4-tetramethyl-1,4-butadienyl)bis hydroperoxide or a mixture thereof.

7. The method of claim 1, wherein the chromium compound is chromium trioxide ($CrO_3$); chromium hexacarbonyl ($Cr(CO)_6$); coordinate ligand derivatives of chromium tetra-carbonyl ($Cr(CO)_4X$) wherein ligand X is 1,10 phenanthroline, 2,2'-dipyridyl, ethylenediamine, cyclohexane-1,2-diamine or 2,5-dithiahexane; coordinate ligand derivatives of chromium tricarbonyl ($Cr(CO)_3Y$) wherein ligand Y is diethylenetriamine or 3,6,9-trithiaundecane; chromyl oxides $CrO_2Z_2$ wherein Z is acetate or benzoate; or chromium (VI) anhydride compounds of the formula:

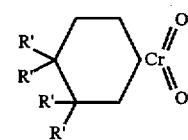

wherein R' is alkyl group.

8. The method of claim 7 wherein the chromium compound is $CrO_3$.

9. The method of claim 8, wherein the organic hydroperoxide is added in an amount which provides a mole ratio of hydroperoxide to the alkyl substituted styrene of the precursor polymer of from about 8:1 to about 25:1 and the $CrO_3$ is added in a molar amount that is from 5 to 15 mole % that of the alkyl substituted styrene content of the precursor polymer.

10. The method of claim 1, wherein at least 5 mole % of the paramethyl group of the paraalkylstyrene content of the precursor polymer is oxidized to a carbonyl atom containing functional group.

11. A method of introducing functionality into a copolymer of an isoolefin and an alkylstyrene at the primary benzyl carbon atom comprising the stops of:

forming a solution of said copolymer in a hydrocarbon solvent;

adding to said polymer solution a catalytically effective amount of $CrO_3$ and an amount of an organic hydroperoxide effective to oxidize at least 5 mole % of the alkylstyrene group of said polymer.

12. The method of claim 11, wherein the $CrO_3$ is added in an amount relative to the alkylstyrene content of the copolymer to provide a (mole) ratio thereto of from about 0.01 to about 0.15.

13. The method of claim 12, wherein the organic hydroperoxide is added in an amount relative to the alkylstyrene content of the copolymer to provide a mole ratio thereto of from about 5:1 to about 30:1.

14. The method of claim 13, wherein the organic hydroperoxide is a dialkyl hydroperoxide or an alkyl hydroperoxide.

15. The method of claim 14, wherein the polymer solution, after catalyst and organic hydroperoxide addition, is maintained at a temperature of from about 20° C. to about 50° C. for at least 10 hours.

* * * * *